(12) United States Patent
Fenton

(10) Patent No.: US 8,117,869 B2
(45) Date of Patent: Feb. 21, 2012

(54) BLANK MOLD FOR AN I.S. GLASS FORMING MACHINE

(75) Inventor: F. Alan Fenton, Granby, CT (US)

(73) Assignee: Emhart Glass S.A., Cham (CH)

( * ) Notice: Subject to any disclaimer, the term of this patent is extended or adjusted under 35 U.S.C. 154(b) by 1181 days.

(21) Appl. No.: 11/414,063

(22) Filed: Apr. 27, 2006

(65) Prior Publication Data
US 2007/0251274 A1  Nov. 1, 2007

(51) Int. Cl.
C03B 9/36 (2006.01)
C03B 9/14 (2006.01)
C03B 9/193 (2006.01)

(52) U.S. Cl. ........ 65/229; 65/227; 65/230; 65/231; 65/232; 65/235

(58) Field of Classification Search ........... 65/357, 65/361, 359, 264
See application file for complete search history.

(56) References Cited

U.S. PATENT DOCUMENTS

| | | | |
|---|---|---|---|
| 1,654,731 A * | 1/1928 | Ingle | 65/219 |
| 1,911,119 A * | 5/1933 | Ingle | 65/219 |
| 3,171,728 A * | 3/1965 | Andersen | 65/76 |
| 3,357,810 A * | 12/1967 | Crouse | 65/234 |
| 4,191,548 A * | 3/1980 | Fortner et al. | 65/79 |
| 4,367,088 A * | 1/1983 | Belletti | 65/234 |
| 4,444,578 A * | 4/1984 | Marroquin | 65/209 |
| 4,470,836 A | 9/1984 | Delgadillo et al. | |
| 4,936,893 A * | 6/1990 | Yamada et al. | 65/374.11 |
| 5,858,050 A * | 1/1999 | Slocum et al. | 65/225 |

FOREIGN PATENT DOCUMENTS

| | | |
|---|---|---|
| EP | 1329428 | 7/2003 |
| JP | 08198630 | 6/1996 |
| JP | 2001328821 | 11/2001 |

\* cited by examiner

Primary Examiner — Matthew Daniels
Assistant Examiner — Jodi C Franklin
(74) Attorney, Agent, or Firm — Reinhart Boerner Van Deuren s.c.

(57) ABSTRACT

A blank mold for an I. S. Machine is made up of a pair of opposed engaged blanks. When closed, these blanks have a top surface with an opening. The blanks have an inner surface defining the side wall of a parison which extends upwardly to a position a defined distance below the top surface of the blanks and a continuous, beveled surface connecting the top of the inner surface defining the side wall of the parison and the top opening of the blanks. A pair of funnels, each having a continuous beveled surface extending from a circular horizontally disposed top opening downwardly to smaller centrally located bottom opening, are interfit with the top of the blanks with the top opening of the blanks and the bottom opening of the funnel being coextensive.

12 Claims, 4 Drawing Sheets

BLANK MOLD FOR AN I.S. GLASS FORMING MACHINE

BACKGROUND OF THE INVENTION

An I. S. machine is supplied with discrete gobs of molten glass from a feeder. The gobs are routed via a delivery system which drops each gob into a desired blank mold in the machine. The machine has a number of sections, 10 for example, and each section makes the same number of bottles per cycle, two for example. In such a "double gob" machine, each section will have a pair of blank molds. Each blank mold is defined by two opposed side mold halves or blanks which are displaced, by a mold open and close mechanism, from an open position to a closed position where the mold halves engage, clamping a bottom mold there between. These molds are open at the top. A gob will drop into the mold and the top opening will be closed by a baffle. The lower surface of the baffle, with the inner surfaces of the blanks and the bottom mold define the outer surface of the "parison" which will be formed in the blank mold.

It is advantageous for a gob to drop vertically into its mold along the vertical axis of the mold (this can be even more important when non round ware is to be formed). As a practical matter this may not happen and then operators may rely on a funnel mechanism to improve the delivery of the gob into the mold. The funnel mechanism, which has been used since it was developed in 1928 (see U.S. Pat. No. 1,911,119) is a device that supports a funnel which can be displaced from a remote position to an advanced operating position where the axis of the funnel is coaxial with the axis of the mold and directly above the mold. The funnel will perfect the downward trajectory of a gob so that it will enter the blank as desired.

In the actual sequencing of the machine, the blank molds will be closed (open at the top), the funnel will be moved to the operating position on top of the mold, the gob will be dropped through the funnel into the mold, and a baffle mechanism will operate to advance a baffle from a remote position to an operating position on top of the funnel. "Settle blow" air will be blown out of the baffle downwardly into the mold to push the gob down into the mold. At the conclusion of "settle blow", the baffle will be displaced back to its remote position, the funnel will be retracted back to its remote position, and the baffle will be displaced to its operating position where it closes the open top of the blank mold. The "parison" will now be formed. Once formed (and cooled to the point where it can be transported), the baffle is displaced back to its remote position, the blank molds are opened and the "parison" is displaced to the blow station where it will be blown into a bottle.

OBJECT OF THE INVENTION

It is an object of the present invention to provide an improved I. S. machine which can improve the trajectory of a gob without the use of a funnel mechanism.

Other objects and advantages of the present invention will become apparent from the following portion of this specification and from the accompanying drawings which illustrate, in accordance with the mandate of the patent statutes, a presently preferred embodiment incorporating the principles of the invention.

DESCRIPTION OF THE PREFERRED EMBODIMENTS

Figure 1:
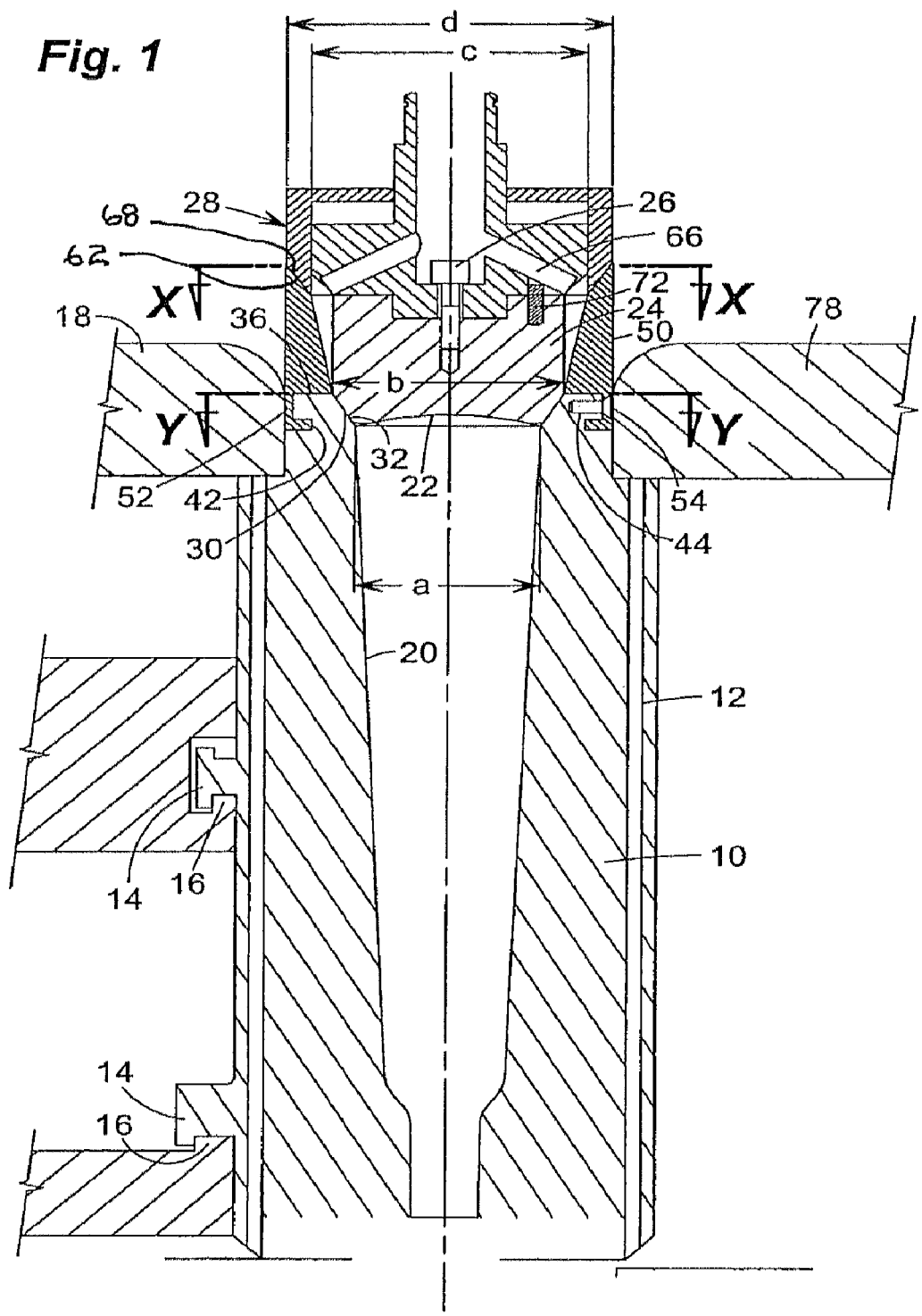
FIG. 1 shows an elevational cross-sectional view of a pair of blank molds in the closed position.

The blank station of each section of an I. S. Machine will have one or more blank molds. Each blank mold has a pair of opposed mold halves or blanks 10. Each blank has a number of air passages 12 which extend vertically through the mold and are located circumferentially about the blank. The blanks have a number of hangars 14 which are received by suitable flanges 16 on the mold open and close mechanism. Also, a part of the mold open and close mechanism are air plenums 18 which supply air to the air passages.

The blanks 10 have an interior surface 20 which defines the side wall of the parison. The bottom surface 22 of a baffle 24 is secured by a screw 26 to the baffle head 28. When the baffle is, as illustrated, at its fully down position, the bottom surface defines the bottom surface of the parison (the parison is formed upside down). The baffle 24 and blanks 10 have matched inclined annular surfaces 30, 32 to affect the desired sealing of the interior of the closed blanks.

Figure 2:
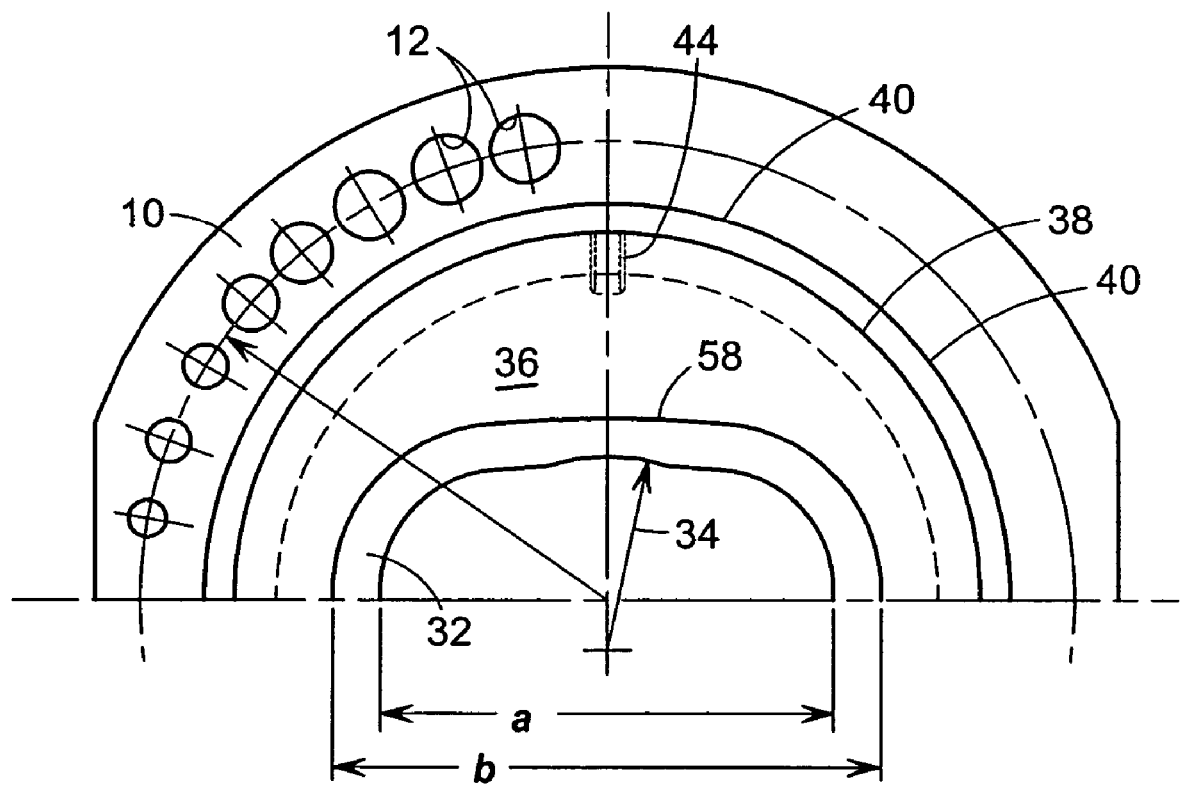
FIG. 2 is a view of one of the blanks taken at Y-Y of FIG. 1.

FIG. 2 shows that the semi annular opening 34 is oblong for a non round bottle having an oblong base. The inclined surface 32 of the blank ends at a horizontal flat top surface 36. This surface has a semi cylindrical outer edge 38 which is set in from the outer semi cylindrical top 40 of the blank. A semi annular recess 42 is defined in the semi cylindrical outer edge and a screw hole 44 is located in the semi cylindrical outer edge 38.

Figure 3:
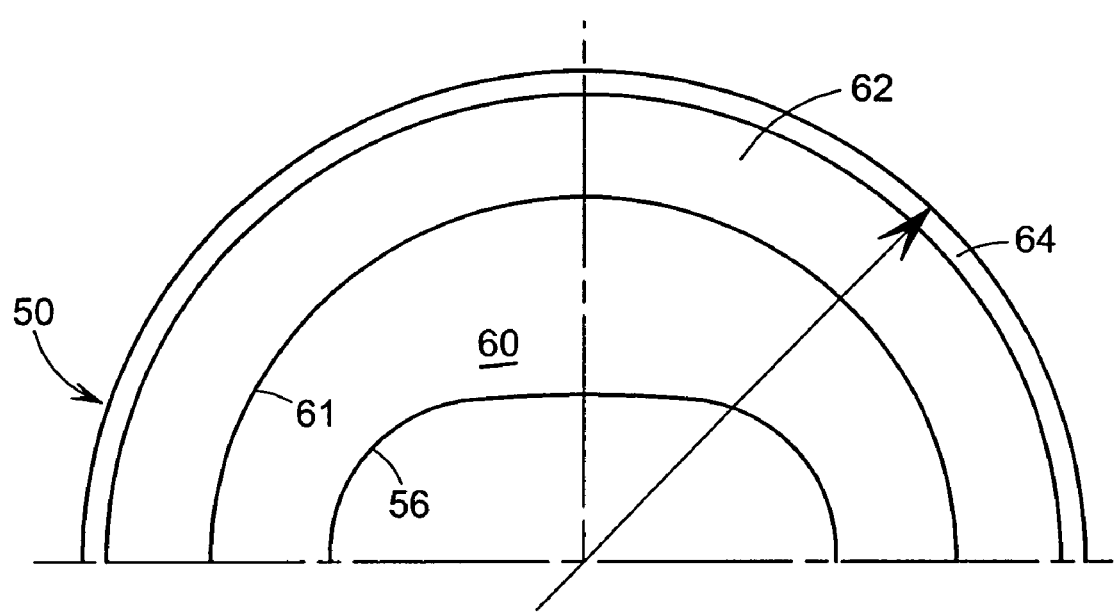
FIG. 3 is a view of the funnel taken at X-X of FIG. 1.

A semi cylindrical funnel 50 has an internally recessed bottom 52 for placement within the recessed top of the blank. A screw 54 holds the funnel in place on the top of the blank. As can be seen from FIG. 3, the funnel has a bottom oblong opening 56 which corresponds to the top oblong opening 58 of the blank. The interior directing surface 60 of the funnel transitions upwardly to a circular top opening 61. A beveled semi cylindrical sealing surface 62 extends between the top opening 61 and the narrow top surface 64.

Figure 4:
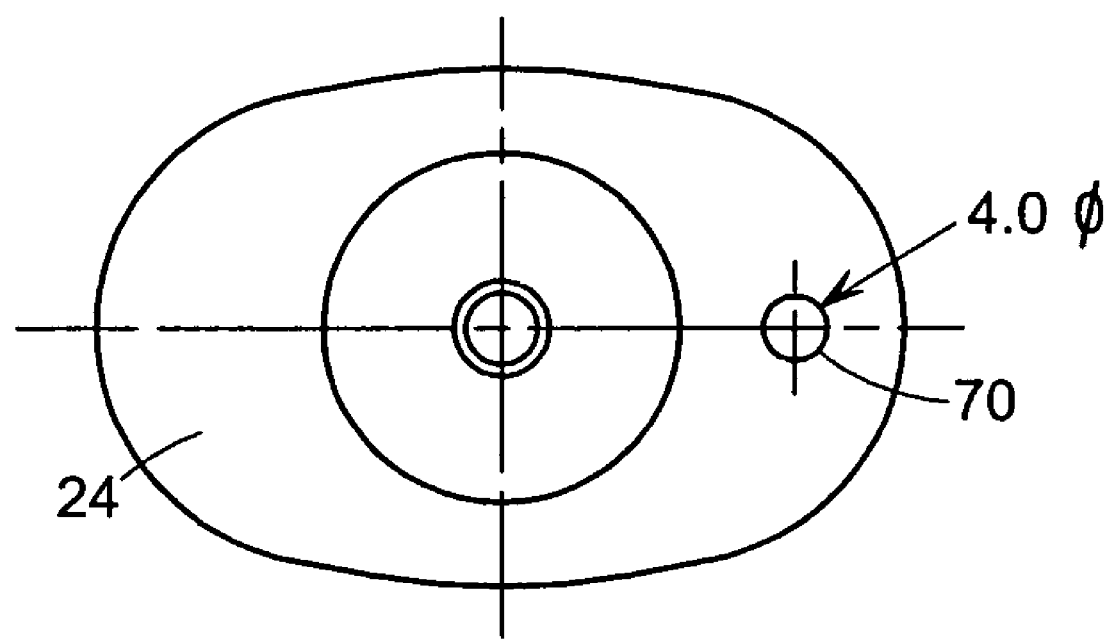
FIG. 4 is a top view of the baffle of the baffle mechanism shown in FIG. 1.

The baffle mechanism includes a head 28 which is secured to an arm and the arm is displaceable from a remote position to a position above the closed blanks in a conventional manner. The head has two vertical positions: 1. An up "settle blow" position where the baffle is located spaced from the inclined sealing surface 32 of the blanks, and 2. A down position where the inclined sealing surface 30 of the head engages with the sealing surface 32 of the blanks. FIG. 4 illustrates the oblong shape of the baffle with a vertical hole 70 for receiving an orientation pin 72. In the "settle blow" position, air is directed into the blank molds via holes 66 in the head 28. In the down position, the bottom beveled surface 68 of the baffle engages the corresponding surface 62 on the funnel to locate the baffle 24 against the blanks.

With the funnel a part of the blank, it no longer is necessary to support the funnel on a displaceable mechanism. This not only greatly reduces the cost of performing the desired function, it speeds up the process since the baffle only has to displaced once and funnel mechanism movement is eliminated.

The invention claimed is:
1. A blank mold for an I.S. Machine comprising
a pair of opposed engaged blanks together defining a top surface with an opening therein, each blank including:

an inner surface defining the side wall of a parison, said inner surface extending upwardly to a position a defined distance below the top surface of the blank, and a continuous, beveled surface connecting the top of the inner surface defining the side wall of the parison and the top opening of the blank, a pair of semi-cylindrical funnels, each having a continuous beveled surface extending from a circular horizontally disposed top opening downwardly to smaller centrally located bottom opening, each semi-cylindrical funnel and each blank is configured to interfit together with the top opening of the pair of opposed blanks and the bottom opening of the associated pair of semi-cylindrical funnels being coextensive and each semi-cylindrical funnel is coupled to an associated blank, and means for releasably connecting each semi-cylindrical funnel to the blank to which it is fit.

2. A blank mold according to claim 1, wherein the bottom opening of said funnels fit to said blanks and the top opening of said engaged blanks are oblong.

3. A funnel apparatus for a blank mold of an I.S. Machine with the blank mold including a pair of opposed engaged blanks together defining a top surface with a opening and with the blank mold configured to couple with a baffle mechanism, the funnel apparatus comprising:

a pair of semi-cylindrical funnel members, with each semi-cylindrical funnel member configured to couple with one of the blanks, each semi-cylindrical funnel member comprising:

an internally recessed bottom portion configure to engage a recessed top portion of each blank; and a fastener configured to couple the semi-cylindrical funnel member to the blank and hold the semi-cylindrical funnel member in place on top of the blank, wherein when the blanks are engaged together, the pair of semi-cylindrical funnel members are configured to receive the baffle mechanism.

4. The funnel apparatus of claim 3, including each semi-cylindrical funnel member defining a surface configured to extend between a top portion of the funnel member and a bottom portion of the semi-cylindrical funnel member.

5. The funnel apparatus of claim 4, wherein the top portion of each semi-cylindrical funnel member defines a circular opening and the bottom portion of the semi-cylindrical funnel member defines an oblong opening 6. The funnel apparatus of claim 5, including a beveled semi cylindrical sealing surface extending between the circular opening and a top surface of each semi-cylindrical funnel member, and configured to engage a corresponding beveled surface defined on the baffle mechanism.

7. The funnel apparatus of claim 3, wherein the fastener is a screw.

8. A blank mold for an I.S. Machine including a funnel apparatus that does not require use of a funnel moving mechanism, and with the blank mold configured to couple with a baffle mechanism, the blank mold comprising:

a pair of opposed engaged blanks together defining a top surface with an opening therein, each blank including:

an inner surface defining the side wall of a parison, said inner surface extending upwardly to a position a defined distance below the top surface of the blank, and a continuous, beveled surface connecting the top of the inner surface defining the side wall of the parison and the top opening of the blank, the funnel apparatus including a pair of semi-cylindrical funnel members, with each semi-cylindrical funnel member configured to couple with one of the blanks, each semi-cylindrical funnel member comprising:

an internally recessed bottom portion configure to engage a recessed top portion of each blank; and a fastener configured to hold the semi-cylindrical funnel member in place on top of the blank, wherein when the blanks are engaged together, the pair of semi-cylindrical funnel members are configured to receive the baffle mechanism;

wherein said fastener couples said semi-cylindrical funnel member to said blank.

9. The blank mold for an I.S. Machine of claim 8, including each semi-cylindrical funnel member defining a surface configured to extend between a top portion of the semi-cylindrical funnel member and a bottom portion of the semi-cylindrical funnel member.

10. The blank mold for an I.S. Machine of claim 9, wherein the top portion of each semi-cylindrical funnel member defines a circular opening and the bottom portion of each semi-cylindrical funnel member defines an oblong opening 11. The blank mold for an I.S. Machine of claim 10, including a beveled semi cylindrical sealing surface extending between the circular opening and a top surface of each semi-cylindrical funnel member, and configured to engage a corresponding beveled surface defined on the baffle mechanism.

12. The blank mold for an I.S. Machine of claim 8, wherein the fastener is a screw.

* * * * *

UNITED STATES PATENT AND TRADEMARK OFFICE
CERTIFICATE OF CORRECTION

| | | |
|---|---|---|
| PATENT NO. | : 8,117,869 B2 | Page 1 of 1 |
| APPLICATION NO. | : 11/414063 | |
| DATED | : February 21, 2012 | |
| INVENTOR(S) | : F. Alan Fenton | |

It is certified that error appears in the above-identified patent and that said Letters Patent is hereby corrected as shown below:

In the claims:

Column 4, Line 40:

"semi-cylindrical funnel member defines an oblong opening" should read --semi-cylindrical funnel member defines an oblong opening.--.

Signed and Sealed this
Seventeenth Day of April, 2012

David J. Kappos
*Director of the United States Patent and Trademark Office*